United States Patent [19]
Yoshimi et al.

[11] Patent Number: 5,618,486
[45] Date of Patent: Apr. 8, 1997

[54] PROCESS FOR MANUFACTURING A HEAT-RESISTANT MOLDED FOAM PRODUCT

[75] Inventors: Toru Yoshimi, Sasima-gun; Yasuo Imai, Nara; Toshinobu Kogi, Souraku-gun, all of Japan

[73] Assignee: Sekisui Plastics Co., Ltd., Nara, Japan

[21] Appl. No.: 441,964

[22] Filed: May 16, 1995

[51] Int. Cl.⁶ .................................................. B29C 43/04
[52] U.S. Cl. .......................................... 264/321; 264/327
[58] Field of Search ................................. 264/321, 544, 264/327

[56] References Cited

U.S. PATENT DOCUMENTS

| | | | |
|---|---|---|---|
| 4,020,126 | 4/1977 | Gander et al. | 264/544 |
| 4,127,631 | 11/1978 | Dempsey et al. | |
| 4,462,947 | 7/1984 | Huggard | 264/321 |
| 4,466,933 | 8/1984 | Huggard | 264/321 |
| 4,582,665 | 4/1986 | Jabarin | 264/544 |
| 4,693,941 | 9/1987 | Ostapchenko | 264/544 |
| 4,929,482 | 5/1990 | Moritani et al. | 428/36.4 |
| 4,981,631 | 1/1991 | Cheung et al. | 264/321 |
| 5,000,991 | 3/1991 | Hayashi et al. | |
| 5,213,754 | 5/1993 | Kawaguchi et al. | 264/544 |
| 5,322,663 | 6/1994 | Lai et al. | 264/544 |
| 5,405,563 | 4/1995 | Hayashi et al. | 264/321 |

FOREIGN PATENT DOCUMENTS

| | | | |
|---|---|---|---|
| 0471528 | 2/1992 | European Pat. Off. . | |
| 56-38215 | 4/1981 | Japan | 264/544 |
| 59-135237 | 8/1984 | Japan . | |
| 3-76626 | 4/1991 | Japan | 264/544 |
| 6-134854 | 5/1994 | Japan . | |

OTHER PUBLICATIONS

English Abstract of Japanese Patent Unexamined Publicaiton No. 6–134854, Date: 17 May 1994.

*Primary Examiner*—Allan R. Kuhns
*Attorney, Agent, or Firm*—Nikaido Marmelstein Murray & Oram LLP

[57] ABSTRACT

There is provided a process for manufacturing a heat-resistant molded foam product which comprises:

(a) preheating a foamed polyester resin sheet of low crystallinity;
(b) molding the sheet into a molded product,
 (i) heating only that portion of the preheated sheet which is convertible into a final product; such heating being conducted for a period of time such that the heated portion of the sheet reaches an average crystallinity of greater than about 20%, and
 (ii) cooling the unheated portion of said preheated sheet; and
(c) cooling the resulting molded product, whereby distortion of the molded product is restrained when heated, and the molding time is shortened.

10 Claims, 12 Drawing Sheets

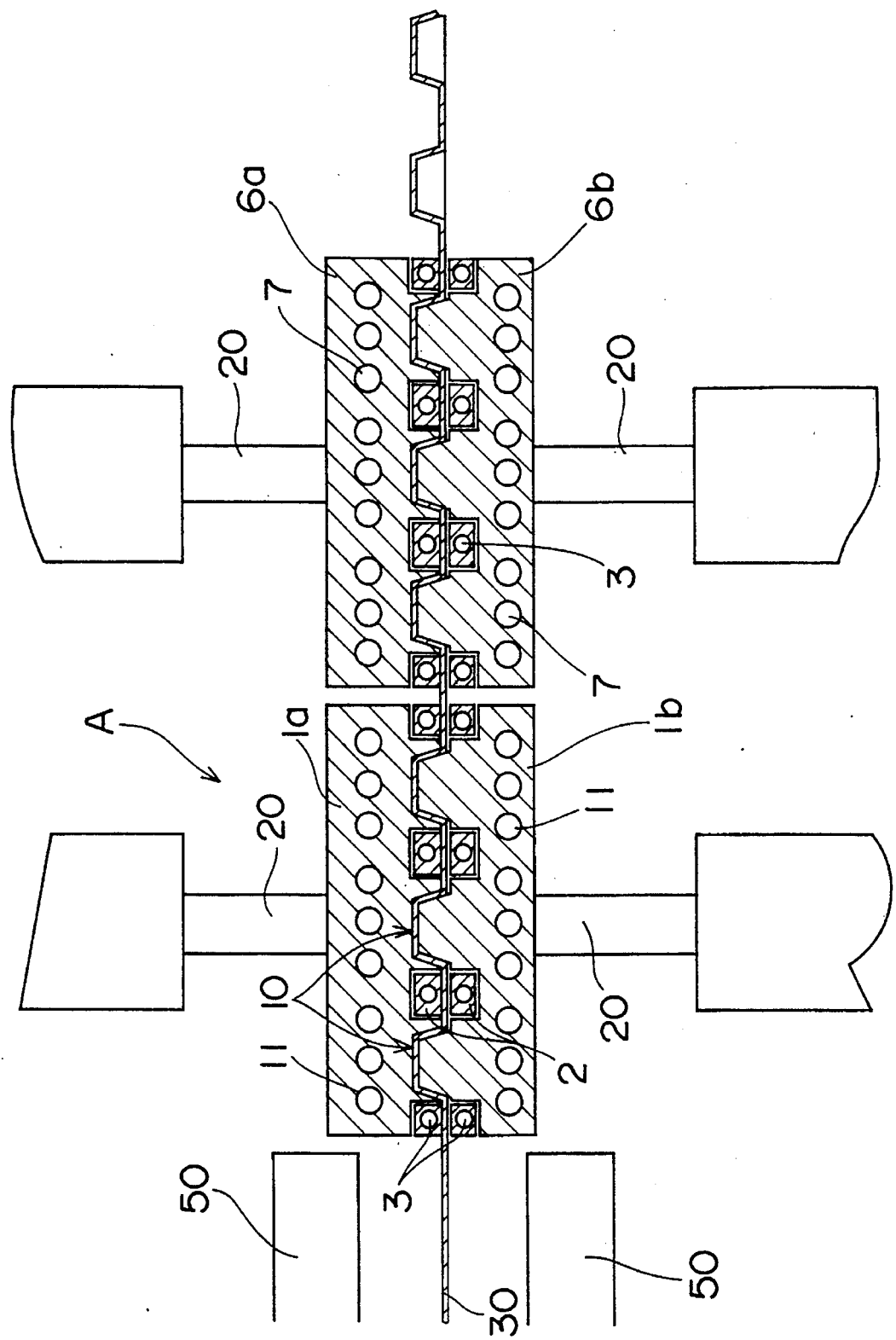

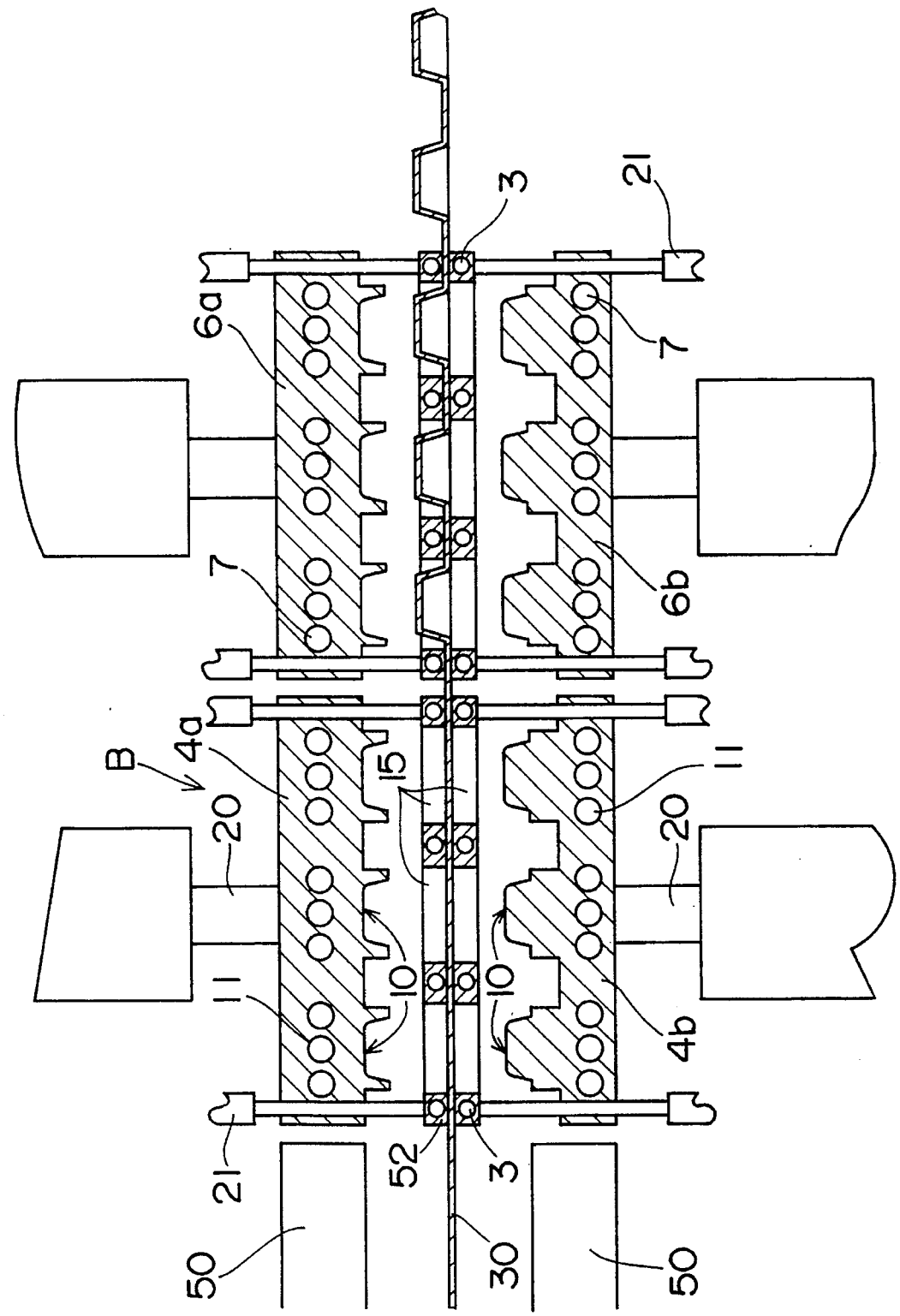

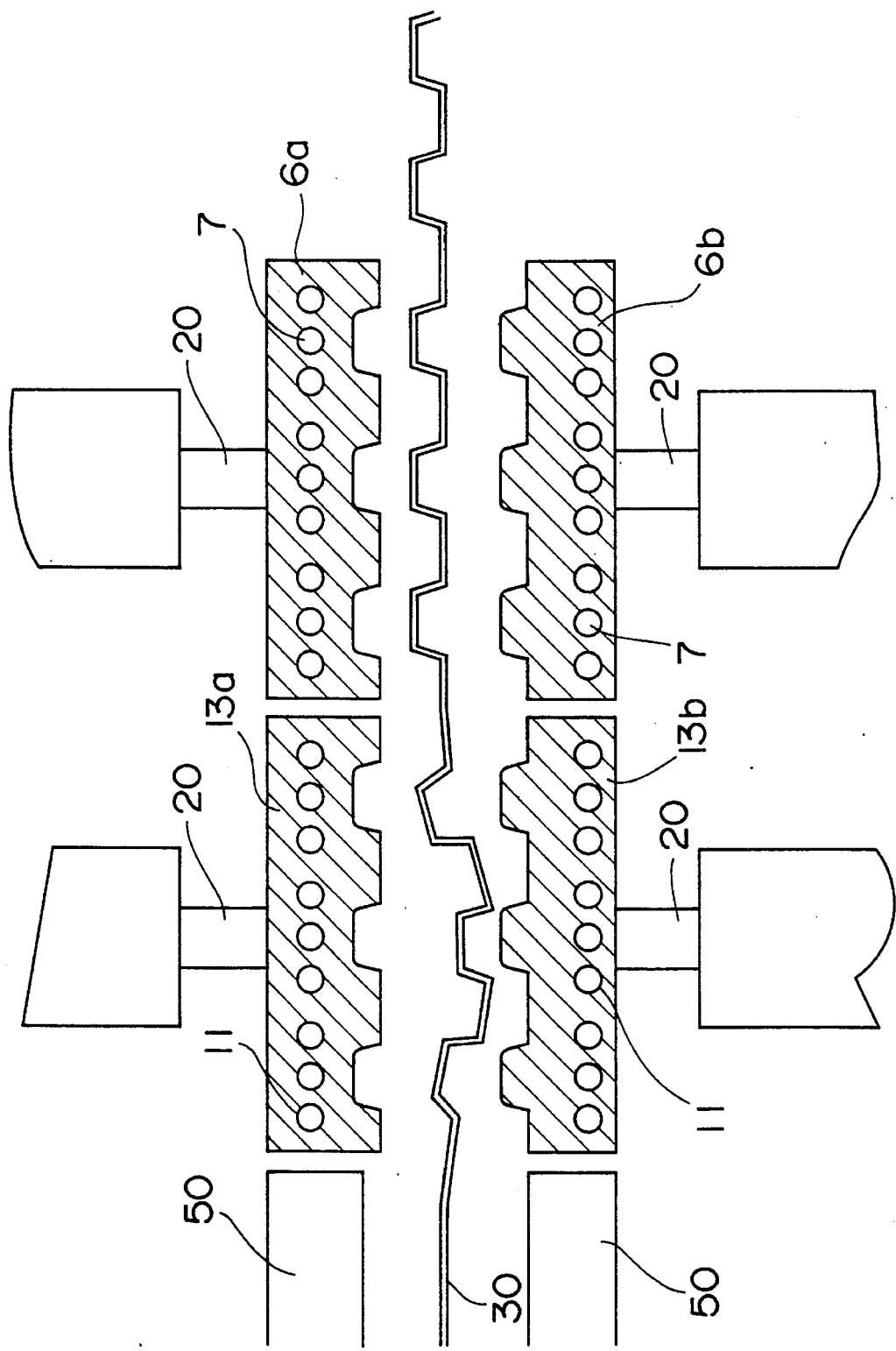

PROCESS FOR MANUFACTURING A HEAT-RESISTANT MOLDED FOAM PRODUCT

FIELD OF THE INVENTION

The present invention relates to a process for manufacturing a heat-resistant molded foam product by molding a foamed polyester resin sheet, and more particularly to a process for molding a foamed polyester resin sheet of low crystallinity to produce a heat-resistant molded foam product particularly useful for a lightweight food container or the like excellent in heat resistance which is not thermally distorted even though heated by an electronic oven, an oven or the like.

BACKGROUND OF THE INVENTION

There are widely used, as a variety of food containers, molded products obtained by molding a sheet made of polyester resin, particularly polyethylene terephthalate. Of these, a polyester resin molded product increased in crystallizability to increase the heat resistance, is used as an ovenable tray. FIGS. 10a and 10b show a food container 60 as example of molded product.

Such a polyester resin molded product increased in crystallizability is obtained by once molding a sheet-like polyester resin with the use of a molding die of high temperature enabling the polyester resin to be crystallized, and by continuously heating the polyester resin to accelerate the crystallization. The reason why such processing to increase the crystallizability is conducted, is that if the polyester resin is merely molded, the polyester resin molded product has low crystallinity, which is not sufficiently heat-resistant. The following will discuss the reason why such a processing of increasing the crystallizability is conducted after the sheet has been molded. If the crystallinity of a sheet, before being molded, is high, the moldability of the sheet is lowered. Specifically, for example, such a higher crystallinity sheet is particularly poor in elongation at the time of molding. This disadvantageously prevents the sheet from being molded accurately with respect to details in the mold. Further, as compared with a foamed polyester resin molded product, the molded product thus obtained is relatively high in density and therefore uneconomical.

Each of U.S. Pat. No. 4,462,947 and U.S. Pat. No. 4,466,933 discuss a process for molding a foamed polyester resin sheet of which foaming magnification is relatively low, with the use of a molding die at high temperature enabling the polyester resin to be crystallized during molding, and continuously heating the sheet to accelerate the crystallization, thus obtaining food containers which are excellent in heat resistance. According to a general molding method, however, a foamed polyester resin sheet is heated to a crystallization temperature not only at that part thereof which results in a final product, but also in other portions thereof, which will later be trimmed. Accordingly, the sheet is considerably softened in its entirety and may readily be distorted even with a slight external force.

Further, as shown in FIG. 11, even after being molded with molding dies 13a, 13b, the sheet 30 which has been considerably softened in its entirety, generally hangs down, and is distorted due to its own weight. In addition, after the crystallization has been accelerated, it is difficult to readily release the foamed polyester resin sheet from the molding die at the high temperature above-mentioned. Accordingly, the resulting molded product is considerably distorted due to the external force exerted at the time of mold release or due to parts of the sheet hanging-down because of its own weight after having been molded. Such distortion is observed particularly in a process for molding, for example, a polyester resin sheet which has been highly foamed to a foaming magnification of 2 times or more. Continuously heating the sheet to accelerate the crystallization thereof, produces a molded product improved in heat resistance. The distortion becomes greater as the foaming magnification of the foamed polyester resin sheet is increased and as the temperature at which the crystallization is conducted is increased. More specifically, as the foaming magnification increases and as the temperature is made higher, the foamed sheet is more readily softened. It may be considered that, when a polyester resin sheet, foamed to a foaming magnification of 2 or more, is heated to such a high temperature as to enable the sheet to be crystallized, the sheet is remarkably distorted.

Accordingly, the molded sheet is not easy to release from a high temperature molding die without any distortion. Thus, if the sheet is forcibly released, the distortion thereof becomes great. Further, since the sheet is remarkably softened in its entirety even after having been molded, the sheet greatly hangs down and is distorted due to its own weight. To prevent such distortion, it is preferable to release the molded product, thus obtained with the use of one molding die, through the steps of molding a foamed polyester resin sheet under conditions sufficient to accelerate the crystallization thereof; and cooling the sheet to temperature (which is preferably not greater than the glass transition point) at which the sheet has sufficient strength to prevent the sheet from being distorted. For the following reasons, however, it is not suitable for industrial production to conduct the steps of molding, crystallizing and cooling in a single one molding die, i.e., to continuously conduct the steps of heating and cooling within one molding die. That is, such an arrangement requires much time which lengthens the molding cycle and increases the energy loss. In view of the foregoing, to achieve industrial production, it is required to separate the heating die from the cooling die.

When the foamed polyester resin sheet, once distorted after having been molded and accelerated in crystallization, is cooled, there is produced a molded product which is just as distorted. Accordingly, the sheet is often corrected in shape while the sheet is cooled in another cooling die. However, since the molded sheet is distorted and hangs down due to its own weight, it is very difficult to match the position of the molding portion of the cooling die with the position of the molded portion of the sheet. Mostly, these portions are positionally shifted from each other. Thus, there is only obtained a molded product which has been molded once again, and cooled as positionally shifted in a shape different from the shape at the time when the sheet was molded and crystallized. The re-molded product thus obtained is apparently good. However, the inventors have found the following. That is, the re-molded product memorizes the shape obtained at the time when the sheet was first molded and crystallized. Accordingly, when the re-molded product is heated for cooking with the use of an oven or the like, the re-molded product is returned to the originally memorized shape and therefore becomes distorted. Further, the inventors have found that the distortion is caused by the fact that the shape obtained at the time when the sheet was molded and crystallized, has been memorized by the molded product. Thus, the shape of the molded product when molded and crystallized, is memorized. Accordingly, to prevent the molded product from being distorted due to the application of heat thereto, it is important to very accurately maintain the shape of the molded product when molded and crystallized and when cooled. In particular, for a molded product such as an ovenable molded container having a lid to be fitted thereto even after the container has been heated for cooking, it is required to minimize such distortion in view of the lid fitting requirements.

In addition, such distortion of a molded product presents the following defects. It is not possible to assure the internal volume of the contents required for the target molded product. Further, the external appearance is different from that of the target molded product. The respective molded products are different in shape from one another, so that the commercial values thereof are lost. In particular, when a molded product is considerably distorted, the contents thereof may be spilt due to the application of heat when cooked. This contaminates the inside of the oven, presenting a functional defect for a heat-resistant food container.

As a result of study to overcome the defects above-mentioned, the inventors have accomplished the present invention based on the finding that, when a foamed polyester resin sheet of low crystallinity is molded and only that part of the sheet which results in a final product is heated and crystallized, and simultaneously the unheated and therefore uncrystallized portion of the sheet is cooled, a resulting molded product can readily be released from the molding die without it being distorted, and the remaining foamed polyester resin sheet even after released from the molding die, does not hang down due to its own weight.

SUMMARY OF THE INVENTION

It is a main object of the present invention to provide, in a process for manufacturing a heat-resistant molded foam product by molding a foamed thermoplastic polyester resin sheet, an improved process for manufacturing a heat-resistant molded foam product wherein heat caused distortion is restrained.

It is another object of the present invention to provide, in a process for manufacturing a heat-resistant molded foam product by molding a foamed thermoplastic polyester resin sheet, an improved process for manufacturing a heat-resistant molded foam product in which the molding time required for molding can be shortened.

It is a further object of the present invention to provide, in a process for manufacturing a heat-resistant molded foam product by molding a foamed thermoplastic polyester resin sheet, an improved process for manufacturing a heat-resistant molded foam product which has been greatly foamed.

To achieve the objects above-mentioned, the inventors have studied hard to provide a process for manufacturing a heat-resistant molded foam product comprising the following steps:

(a) Passing a foamed polyester resin sheet of low crystallinity into a preheating first zone such that the sheet attains a surface temperature of about 110° to about 150° C.;

(b) Molding the sheet in a second molding zone wherein a part of the mold has a surface temperature from about 150° to about 200° C., (i) The part of the mold having such a heated surface serving to heat only that portion of the sheet which results in the final product. Such heating being conducted for a period of from about 2 to about 20 seconds such that the heated portion of the sheet reaches an average crystallinity of greater than about 20%, (ii) Cooling the unheated portion of the sheet (that which does not result in the final product) in the second molding zone;

(c) Cooling the resulting molded product in a third zone; and (d) Removing the cooled product from the third zone.

BRIEF DESCRIPTION OF THE DRAWINGS

FIG. 5 is a view illustrating in detail a molding process using the molding die A;

FIG. 6 is a view illustrating in detail a molding process using the molding die B;

FIG. 11 is a view illustrating a prior art molding process using a conventional molding die, in which a foamed sheet, after having been molded, hangs down to a considerable extent.

DETAILED DESCRIPTION OF THE INVENTION

When a foamed polyester resin sheet of low crystallinity is molded according to the present invention, there is produced a molded foam product which is excellent in heat resistance and which has been greatly foamed to foaming magnifications of 2 or more. The heat-resistant molded foam product is not distorted by the application of heat thereto for cooking. In particular, a heat-resistant molded foam product which has been further greatly foamed to foaming magnifications of 5 or more can be taken out, with unprotected hands, from an oven or the like after having been heated therein for cooking. More specifically, such an effect can be produced by greatly foaming a polyester resin sheet to impart excellent thermal insulation properties thereto.

Figure 4A:
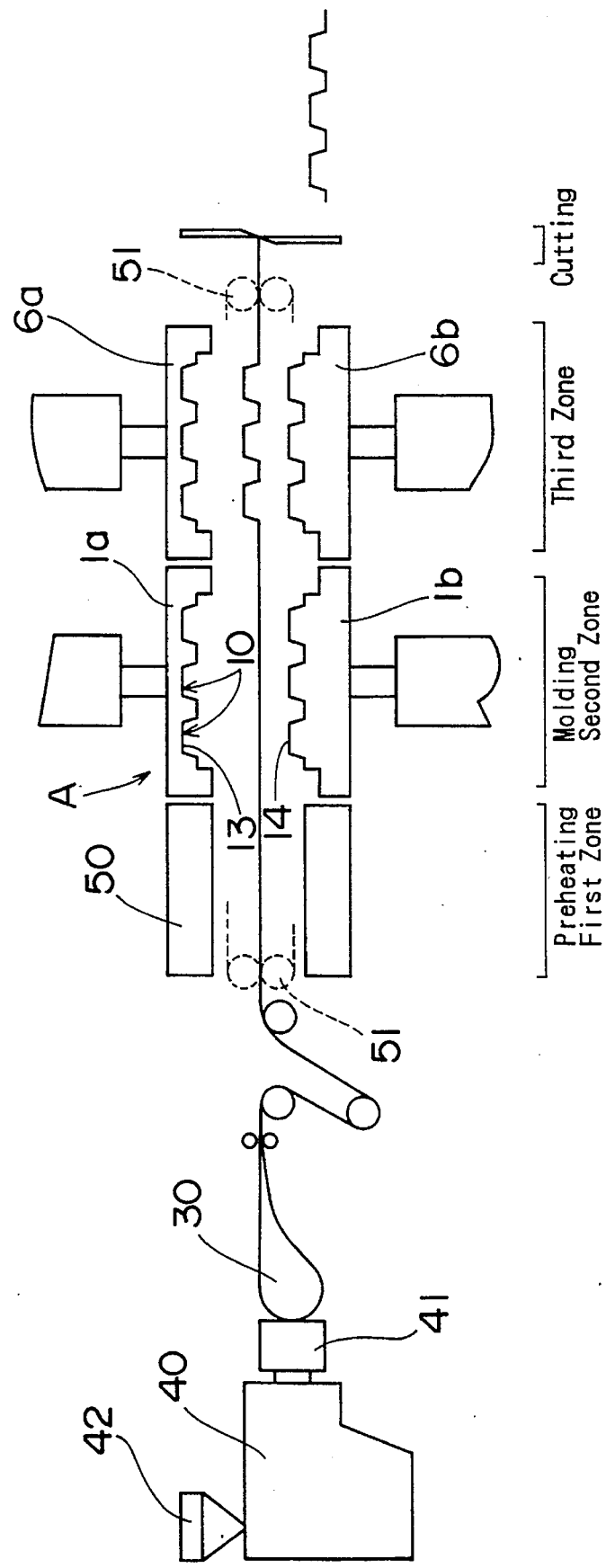
FIG. 4A is a view illustrating an in-line molding process.
Figure 4B:
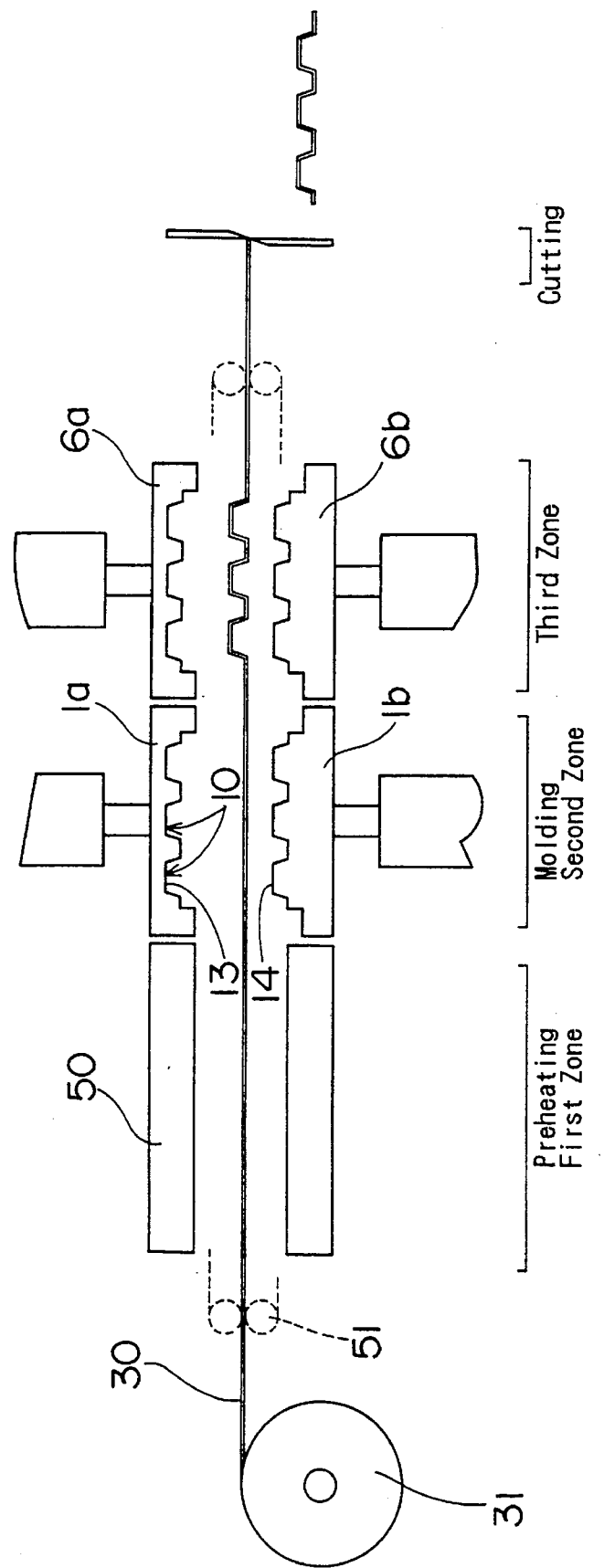
FIG. 4B is a view illustrating a process for molding with the use of a foam sheet roll.

FIGS. 4A and 4B show processes for molding a foamed polyester resin sheet 30 of low crystallinity. In FIG. 4A, the sheet 30 is extruded and foamed through a die 41 from an extruder 40. Indicated by 42 is a hopper. A tubular foam form sheet extruded from the extruder 40 is cut with a blade (not shown) along the extruding direction, and is fed to the next step as a sheet 30. The number of the blades is not limited to one, but 2 to 4 blades disposed along the circumference of the extruded tubular foam sheet may be used to divide the extruded tube into 2 to 4 flat sheets. Each divided sheet may be fed to the next step independently. On the other hand, in FIG. 4B, the sheet 30 is fed from a foam sheet roll 31. First, the foamed sheet is fed to a predetermined amount. At this time, it is preferable to feed the sheet to a predetermined amount using chain clamps 51, roll clamps, or the like, disposed at both ends of the sheet.

In a preheating first zone, the sheet fed as mentioned above is previously heated such that the sheet attains a surface temperature of 110° to 150° C. The sheet surface temperature can be measured with an infrared non-contact thermometer (IR-AH1S) manufactured by Chino Company.

When the surface temperature of the sheet 30 is lower than 110° C., the sheet cannot satisfactorily be molded. When surface temperature of the sheet 30 is higher than 150° C., the crystallization of the sheet is remarkably accelerated before the sheet is molded. This lowers the moldability of the sheet. For example, excessive heating causes the sheet to be remarkably lowered in elongation at the time when the sheet is molded. This disadvantageously prevents the sheet from being molded into a molded product which is accurately detailed. Further, when the crystallization of the sheet 30 is accelerated at the time of preheating before the sheet is molded, the shape of the sheet before molding, i.e., the flat shape thereof, is memorized. Accordingly, even though the sheet could be molded, the resulting molded product will be distorted to a flatter shape when it is heated in an oven or the like. The distortion due to a shape memory effect is greater as the preheating temperature is higher. This not only causes the molded product to be defective in shape, but also reduces the internal volume of the molded product when the molded product is heated in an oven or the like.

The sheet 30 can be preheated by any known means such as conduction heating through contact with a heating plate, radiant heating, convection heating, heating with the use of high-frequency electric power and the like. Any heating media can be used insofar as it does not particularly attack a polyester resin. Of these, there is preferably used radiant heating using an oven 50 or conduction heating through contact of the sheet with heating plates (not shown) which hold the sheet.

Figure 1:
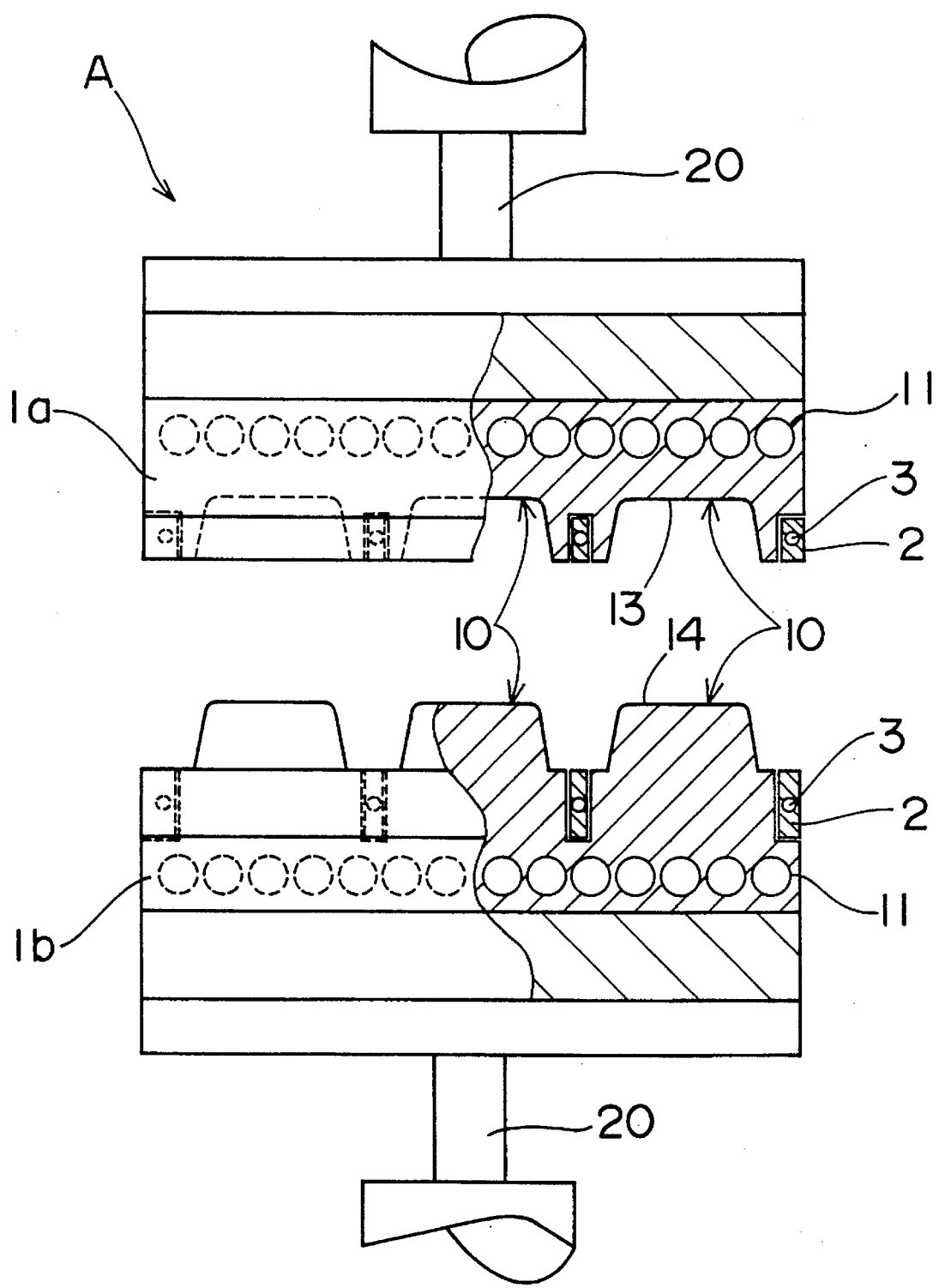
FIG. 1 is a partly sectional side view of a molding die A which is arranged to heat only those parts of a sheet which result in final products, and which is arranged to cool the remaining, unheated portion of the sheet.
Figure 2:
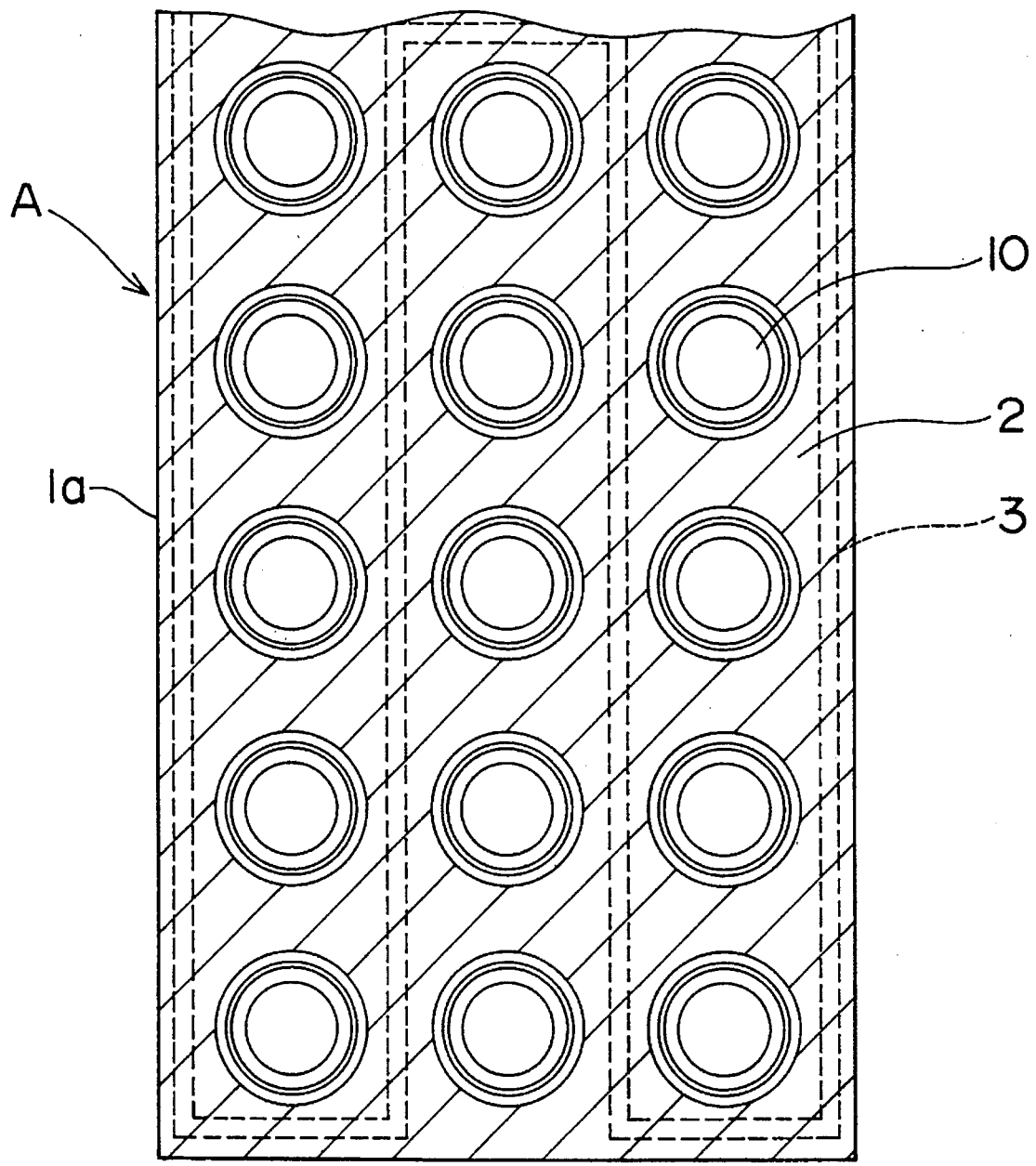
FIG. 2 is a plan view of the molding die A in which hatchings show cooling portions thereof and broken lines show refrigerant passages.
Figure 3:
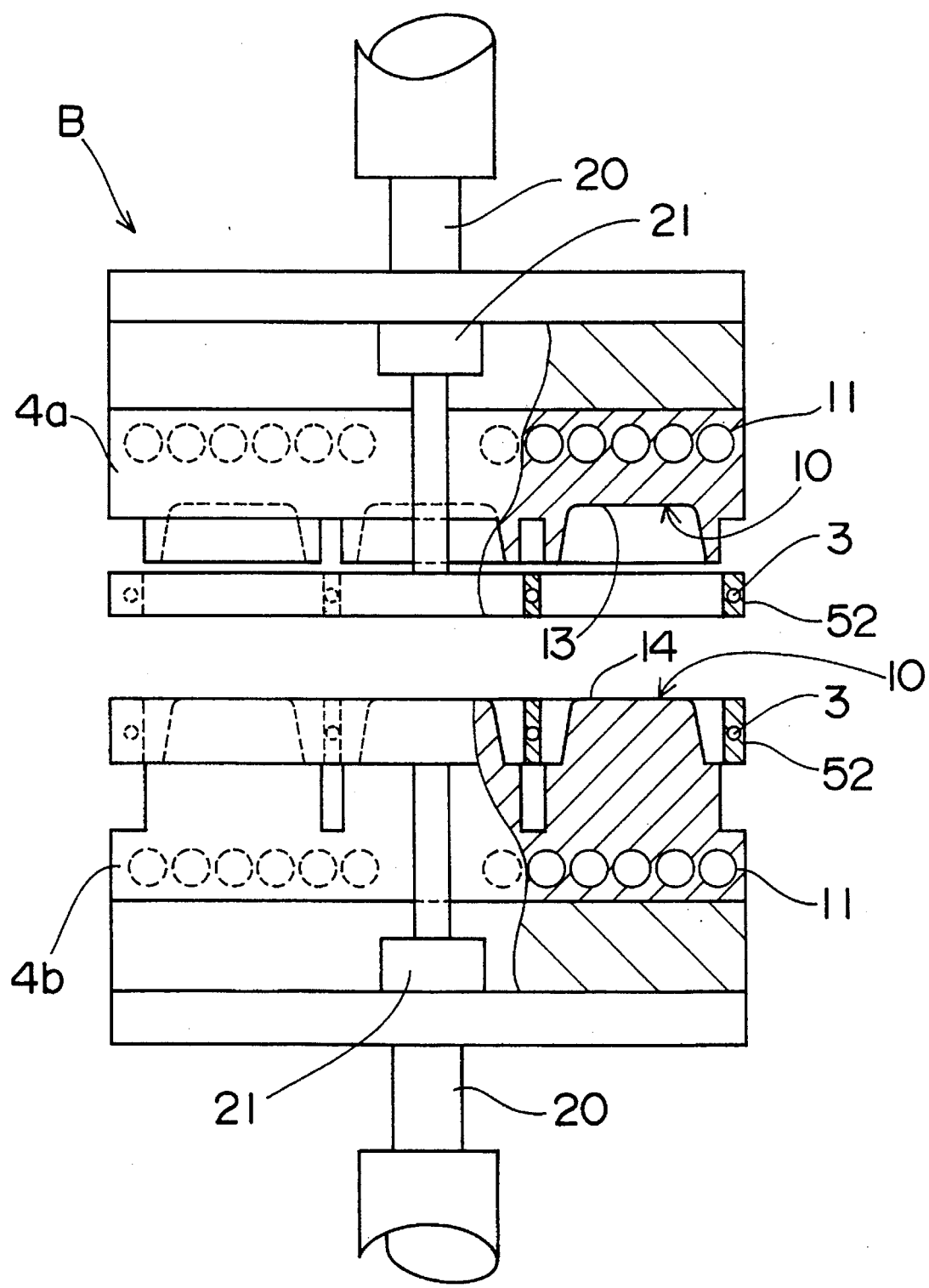
FIG. 3 is a partly sectional side view of a molding die B in which portions not used for heating, i.e., cooling portions, are independently driven as clamp plates.

In a molding second zone, the preheated sheet 30 is molded in a molding die A which comprises an upper die 1a and a lower die 1b, part of which has a surface temperature of 150° to 200° C. The upper die 1a and the lower die 1b are driven by cylinders 20. A molding die of which part has a surface temperature of 150° to 200° C., as shown in FIG. 1 and FIG. 2, is so designed that the surface temperature of a molding portion 10, including a male die portion 13 and a female die portion 14 which correspond to that part of the sheet which results in a final product, is set at 150° to 200° C. Molding referred to in the present invention is a general term which is intended to include: vacuum forming by which a preheated softened sheet is disposed on a molding portion 10 having the shape of a desired product, the air present in the gap between the molding portion of the molding die and the sheet is eliminated, such that the sheet is molded as bonded to the molding portions by atmospheric pressure; and molding in which there are jointly used vacuum forming and pressure forming in which a sheet is contacted with the molding portions by compressed air at a pressure which is not less than atmospheric pressure. In particular, the present invention preferably uses a molding method using both a plug-type mold and a cavity-type mold.

Then, the sheet being molded is heated, only at those parts of the sheet which will result in final products, thereby to accelerate the crystallization. The surface temperature of the molding portions of the molding die is required to be in the range of 150° to 200° C., and is preferably set to the range of 154° to 176° C. This is because the inventors have determined that the polyester sheet has a tendency to accelerate the crystallization most in the range of 154° to 176° C. That is, at these temperatures the crystallization can proceed in a short period of time of 2 to 20 seconds, more preferably 2 to 10 seconds. Thus, the molding cycle can be shortened to remarkably improve the productivity of the apparatus/process.

It is required to heat only those parts of the molded sheet which will be converted into final products, and to cool the remaining, unheated portion(s) of the sheet at the same time. Preferably, the cooled portion 2 is set to have a temperature in the range of 20° to 130° C. More preferably, the portion 2 is cooled to a temperature lower than the glass transition point of polyester resin (which is in the range of about 69° to about 75° C. dependent on the type of polyester resin used). However, when the unmolded portion to be trimmed is cooled to a temperature lower than 20° C., drops of condensation stuck to the surface of the cooled portion are liable to move to the inner side of the molding portion 10. Such portions 10 of the molding die may incorporate, as heating means, a heater 11, such as sheathed heaters or the like, or there may be adopted a method of circulating a heating medium, such as oil or the like, through the die. In the cooled portions of the molding die, there are formed, in zigzags or windings, coolant passages 3 through which a cooling medium flows. Examples of the cooling medium include a liquid such as water, oil and the like, and a variety of gases. The cooling passages 3, may be embedded pipes, but holes may be directly formed in the molding die. Further, the cooling passages 3 may be disposed in the form of a lattice. The cooling portions of the molding die may be made of a porous material such that the sheet 30 is cooled by a gas such as air.

By partially cooling the molding die A, B in the manner above-mentioned, only appreciate portions of the sheet 30 are heated by the molding portions having a surface temperature in the range of 150° to 200° C., preferably 154° to 176° C., The sheet is not considerably softened in its entirety. Since the cooled portion of the sheet serves as a rigid support in the form of a lattice, the molded sheet can readily be released, without being distorted, from the molding die having molding portions 10 which are at a high temperature. Further, the molded sheet, after being released from the die, does not hang down due to its own weight. Further, subjecting the surfaces of the molding portions 10 of the molding die to fluorocarbon resin or sandblast treatment, further facilitates mold release.

According to the manufacturing process of the present invention, a sheet 30 can be molded by the molding portions 10 set to a temperature of 150° to 200° C. higher than the conventional molding temperature. Accordingly, a molded product, which is excellent in heat resistance such that the heat distortion mentioned later is not greater than about 2%, can be obtained in a short period of time of 2 to 20 seconds, preferably 2 to 10 seconds, during which the molded product achieves sufficient crystallinity to provide sufficient heat resistance.

The foamed polyester resin sheet 30 to be used in the present invention is limited to a resin sheet of relatively low crystallinity obtained by molding a polyester resin in the form of a sheet according to any of a variety of methods. For example, the technique disclosed in U.S. Pat. No. 5,000,991 may be used. The foamed polyester resin sheet of relatively low crystallinity refers to a foamed polyester resin sheet of low average crystallinity in the range from 1 to 18%. A foamed polyester resin sheet of high average crystallinity that is higher than 18%, has a reduced moldability. For example, the sheet is remarkably lowered in elongation at the time when the sheet is molded. This disadvantageously prevents the sheet from being molded into a molded product which is accurately detailed. Further, the flat shape of the sheet before being molded has disadvantageously strong shape memory. Thus, the average crystallinity of the foamed polyester resin is preferably low, preferably in the range of 1 to 18%. To obtain such a foamed polyester resin sheet of low crystallinity, a polyester resin may be foamed and then subjected to rapid cooling using a cooling roll, water cooling or the like. However, since the polyester resin is foamed, the sheet has heat insulating properties. Accordingly, the sheet is liable to be increased in crystallinity at the center portion thereof. When the average crystallinity of a foamed polyester resin sheet is lower than 1%, the difference in crystallinity between the sheet surface and the sheet center is disadvantageously increased.

The foamed polyester resin sheet 30 to be used in the present invention is one obtained by foaming a thermoplastic polyester resin. The thermoplastic polyester resins are linear polyesters of polycondensate of an aromatic dicarboxylic acid component and a diol component. Specific examples of the thermoplastic polyester resins include polyethylene terephthalate, polybutylene terephthalate, polybutylene terephthalate elastomer, amorphous polyester, polycyclohexane terephthalate and the like. These resins may be used alone or in combination of plural types. Further, there may also be used a modified resin including 50 or more % by weight of any of these resins.

In addition to the fact that the foamed polyester resin sheet is of low average crystallinity, the foamed polyester resin sheet preferably has a density of 1.27 to 0.175 g/cm$^3$ and a thickness of 0.1 to 5 mm. To give heat insulation properties, lightweight properties, shock-absorbing properties to the resulting heat-resistant molded foam product, the foamed polyester resin sheet is required to have a density of 1.27 g/cm$^3$ or less. The density is preferably not greater than 0.7 g/cm$^3$ and more preferably not greater than 0.3 g/cm$^3$. To further shorten the molding cycle and to minimize the heat distortion of a heat-resistant molded foam product, the foamed polyester resin sheet preferably has density greater than 0.175 g/cm$^3$. The suitable thickness of the sheet to be molded in a molding die, is in the range of 0.1 to 5 mm. If the sheet thickness is thinner than 0.1 mm, the molded product is liable to be insufficient in strength. If the sheet thickness is thicker than 5 mm, the heat insulation properties given to the sheet by foaming the same are liable to cause the crystallinity obtained through preheating and crystallization to become uneven. In particular, such unevenness is remarkably observed between the surface and the center of a thick sheet.

Any of the known blowing agents can be used in the production of the thermoplastic polyester resin foams of the present invention, so long as they are easily vaporizable liquids or thermally decomposable chemicals. Easy vaporizable blowing agents such as inert gases, saturated aliphatic hydrocarbons, saturated alicyclic hydrocarbons, aromatic hydrocarbons, halogenated hydrocarons, ethers and ketones are preferred. Examples of these easy vaporizable blowing agents include carbon dioxide, nitrogen, methane, ethane, propane, butane, pentane, hexane, methylpentane, dimethylbutane, methylcyclopropane, cyclopentane, cyclohexane, methylcyclopentane, ethylcyclobutane, 1,1,2-trimethylcyclopropane, trichloromonofluoromethane, dichlorodifluoromethane, monochlorodifluoromethane, trichlorotrifluoroethane, dichlorotetrafluoroethane, dichlorotrifluoroethane, monochlorodifluoroethane, tetrafluoroethane, dimethyl ether, 2-ethoxy, acetone, methyl ethyl ketone, acetylacetone dichlorotetrafluoroethane, monochlorotetrafluoroethane, dichloromonofluoroethane and difluoroethane. When an ovenable molded container having a lid fitted thereto, is heated for cooking, the lid must remain fitted to the container even after the application of heat thereto. A foamed sheet obtained with the use of inert gas as a blowing agent, such as nitrogen, carbon dioxide, is suitably molded into such an ovenable molded container because the distortion can be minimized. In particular, such a foamed sheet is suitably molded, for example, in an in-line process immediately after it has been extruded and foamed (See FIG. 4A). A foamed sheet obtained with inert gas used as a blowing agent is small in secondary foaming properties at the time when the sheet is molded. It is therefore preferable to use a relatively thick sheet having a thickness in the range of 0.5 to 5 mm.

On the contrary, a foamed sheet obtained without inert gases used as a blowing agent, is great in secondary foaming properties at the time when the sheet is molded (e.g., secondary foaming magnification of 1.5 to 5). Accordingly, even though there is used a relatively thin sheet having a thickness of 0.1 to 3 mm, there can be obtained a molded product such as packing material, food trays or the like which are excellent in shock-absorbing properties and heat insulation properties.

However, when a foamed sheet, obtained without inert gases used as a blowing agent, is molded with the residual blowing agent in an amount greater than 0.1 mol/kg, there is obtained a molded product which has been greatly secondarily foamed, but the blowing agent is liable to remain in the molded product. When the blowing agent remains in the molded product, the molded product may shrink because the foaming agent is dissipated and lost when the molded product is used as by being heated for cooking, or the molded product may further be foamed for the third time when heated for cooking. Accordingly, when such a sheet is used for the ovenable container having a lid fitted thereto as above-mentioned, the amount of the blowing agent remaining in the foamed sheet must be reduced to less than 0.1 mol/kg.

A heat-resistant molded foam product, obtained by molding such a further limited foamed polyester resin sheet, results in a distortion of not greater than 2%, which is required for a molded product at the time when it is heated to a temperature of 170° to 240° C. When the distortion of a molded product, at the time when it is heated to a temperature of 170° to 240° C., is not greater than 2%, the heat resistance and dimensional stability required for a molded product, such as a container having a lid fitted thereto or the like, are satisfied.

According to the process for manufacturing a heat-resistant molded foam product of the present invention, there may be produced a heat-resistant molded foam product produced by molding a laminated sheet containing a foamed polyester resin sheet 30 and a non-foamed film of thermoplastic resin bonded to at least one side of the sheet 30 with the non-foamed film turned inside. Further, a heat-resistant molded foam product may be produced by molding a laminated sheet containing two or more foamed polyester resin sheets. Examples of suitable application of a laminated sheet containing two or more foamed polyester resin sheets, include (i) a food container obtained by molding a two-layer laminated sheet in which a recycled material is used as at least the outside layer of the container, and (ii) a food container obtained by molding a three-layer laminated sheet in which a recycled material is used to at least medium layer of the container.

A non-foamed film or a foamed sheet may be bonded to the sheet 30, or a plurality of such films or sheets may be bonded to the foamed polyester resin sheet. Further, non-foamed films or foamed sheet may be bonded to the both sides of the foam sheet of this invention. The non-foamed film layer has a thickness in the range of 10 to 500 microns, and the foamed polyester resin sheet is preferably thicker than the film layer. When two or more foamed polyester resin sheets are laminated, the total thickness of the resulting laminated sheet must be not greater than 5 mm; otherwise, good moldability cannot be assured.

Examples of a method of bonding a non-foamed film to a foamed polyester resin sheet, include: a method of coextrusion using a plurality of extruders; a method of in-line lamination; a method by which a foamed sheet and a non-foamed film are individually prepared and wound, juxtaposed to each other while being unwound, and are bonded to each other while being passed through a pair of rolls; and a method of bonding the film and the sheet to each other with adhesives. Further, a foamed polyester resin sheet and a non-foamed film may not be previously bonded to each other, but may be bonded to each other at the same time when the sheet and the film which overlap each other while being rewound, are molded.

Preferable examples of the thermoplastic resin of the non-foamed film include thermoplastic polyester, polyolefin, polyamide, polyvinyl chloride, polyacrylonitrile, polyvinylidene chloride and an ethylene-vinyl alcohol copolymer. When there is heat-bonded, to a foamed polyester resin sheet, a film of thermoplastic polyester resin identical with the material of the foamed polyester resin sheet, such a laminated sheet has no foreign material and thus can preferably be recycled.

Examples of methods of laminating two or more foamed polyester resin sheets, include: a method of coextrusion using a plurality of extruders; a method of in-line heat fusion-bonding; a method by which foamed sheets individually prepared and wound, are unwound and then juxtaposed to each other and are then heat fusion-bonded to each other; and a method of bonding the sheets to each other with adhesives. Heat fusion-bonding is preferable because the fusion-bonded sheets can be recycled.

However, the molding die should not be limited to the molding die A or B, but can be modified in design according to the shape of each of a variety of molded products.
(Method of Measuring the Average Crystallinity)

The average crystallinity is determined from quantity of heat of cold crystallization and quantity of heat of fusion in heating by heat-flux DSC (differential scanning calorimetry) in the measurement of heat of transition according to JIS-K-7122 (Method for measuring heat of transition of plastics). Namely, average crystallinity is determined by the following equation:

$$\text{Average Crystallinity (\%)} = \frac{\text{(Quantity of heat of fusion per mol)} - \text{(quantity of heat of cold crystallization per mol)}}{\text{Quantity of heat of fusion per mol of perfect crystallized resin}} \times 100$$

The average crystallinity was measured by using differential scanning calorimeter DSC 200 manufactured by Seiko K.K. For the quantity of heat of perfect crystal fusion of polyethylene terephthalate, there was used 26.9 kJ/mol from Kobunshi Deta Handobukku (published by Baifukan KK).
(Method of Measuring the Rate of Heat Distortion Resistance)

The rate of heat distortion resistance of foamed polyester resin products was calculated according to the following equation (2) using maximum and minimum diameters of the openings of the molded products measured after put in an oven set to a temperature of 220° C. and heated for 10 minutes.

Equation (2):

$$\text{Rate of Heat Distortion Resistance (\%)} = \frac{\text{Maximum Diameter} - \text{Minimum Diameter}}{\text{Maximum Diameter}} \times 100$$

EXAMPLES (Example 1)

There was used an extruded foam sheet obtained using polyethylene terephthalate as the resin (hereinafter referred to as foamed PET sheet). The foamed PET sheet was formed by using nitrogen gas, which is inert gas, as a blowing agent. The foamed PET sheet had a density of 0.38 g/cm$^3$, a thickness of 0.74 mm and an average crystallinity of 7.4%.

After being extruded, the foamed PET sheet was molded in line as shown in FIG. 4A according to the following process.

The foamed PET sheet was molded with the use of the molding die A shown in FIGS. 1 and 2. FIG. 5 shows in detail the molding process.

In a preheating first zone shown in FIG. 4A, the foamed PET sheet was preheated by a heating oven 50 such that the foamed PET sheet attained a surface temperature of 130° C. Next, in the molding second zone, the foamed PET sheet was molded under a molding pressure of 1.1 kg/cm$^2$ with the use of the molding die A of which molding portions 10 for molding and heating the preheated foamed PET sheet, were set to a surface temperature of 175° C. and of which cooling portions 2 (trimming portions) were set to a temperature of 35° C. After being molded, the sheet was maintained for 8 seconds held between the upper die 1a and the lower die 1b which were set to a surface temperature of 175° C., thereby to accelerate crystallization of the molded foam product. Then, the molded sheet was released from the molding die A. The molding die release could readily be carried out without any distortion of the sheet. After released from the die, the sheet did not hang down due to its own weight.

In the third zone, the molded sheet was cooled for 8 seconds as held by cooling dies 6a, 6b set to a surface temperature of 70° C. by a cooling passage 7 for passing the cooling medium such as water. At this time, the molded foamed PET sheet could be held without any positional shift. After being cooled, the molded products were separated from the portion to be trimmed by punching.

The average crystallinity of the molded products thus obtained, was 25.2%. The heat distortion of the molded products was measured as 0%. Thus, there were produced good molded products which had excellent heat resistance. The lids, which fitted well to the molded products before the heat distortion test, were put onto the molded products after the application of heat thereto. It was made sure that these lids were well fitted to all the samples of molded product likewise before the application of heat thereto.

(Example 2)

There was used a foamed PET sheet which was obtained by using butane as a blowing agent. The foamed PET sheet had a density of 0.25 g/cm$^3$, a thickness of 1.5 mm and an average crystallinity of 8.5%, and contained a residual blowing agent of 0.05 mol/kg.

After the foamed PET sheet was wound in the form of a roll 31 as shown in FIG. 4B, the following process was carried out to mold the foamed PET sheet.

The foamed PET sheet was molded with the use of the molding die A shown in FIGS. 1 and 2. The following discusses the molding process in detail.

In a preheating first zone shown in FIG. 4B, the foamed PET sheet was preheated by a heating oven 50 such that the foamed PET sheet attained a surface temperature of 140° C.

In a molding second zone, the foamed PET sheet was molded under a molding pressure of 1.4 kg/cm$^2$ with the use of a molding die having molding portions 10 were set to a surface temperature of 185° C. and having cooling portions 2 were set to a temperature of 65° C. After being molded, the sheet was maintained for 12 seconds held between the upper die 1a and the lower die 1b set to a surface temperature of 185° C., thereby to accelerate the crystallization. Then, the molded sheet was released from the molding die A. The molding die release could readily be carried out without any distortion of the sheet. After released from the die A, the sheet did not hang down due to its own weight.

In a third zone, the sheet was cooled for 12 seconds as held by cooling dies 6a, 6b set to a surface temperature of 73° C. At this time, the molded sheet could be held without any positional shift. After being cooled, the molded products were separated from the portion to be trimmed by punching.

The average crystallinity of the molded products thus obtained, was 28.7%. The heat distortion of the molded products was measured as 1.0%. Thus, there were produced good molded products having excellent heat resistance. The lids, which fitted well to the molded products before a test of heat distortion, were put onto the molded products after the application of heat thereto. It was made sure that these lids were well fitted to the molded products likewise before the application of heat thereto.

(Example 3)

There was used a foamed PET sheet which was obtained by using carbon dioxide as a blowing agent. The foamed PET sheet had a density of 0.65 g/cm$^3$, a thickness of 0.5 mm and an average crystallinity of 6.5%.

The foamed PET sheet was molded with the use of the molding die B shown in FIG. 3, and FIGS. 6 to 8 show in detail the molding process.

In a preheating first zone, the foamed PET sheet was preheated by a heating oven 50 such that the foamed PET sheet attained a surface temperature of 120° C.

Figure 7:
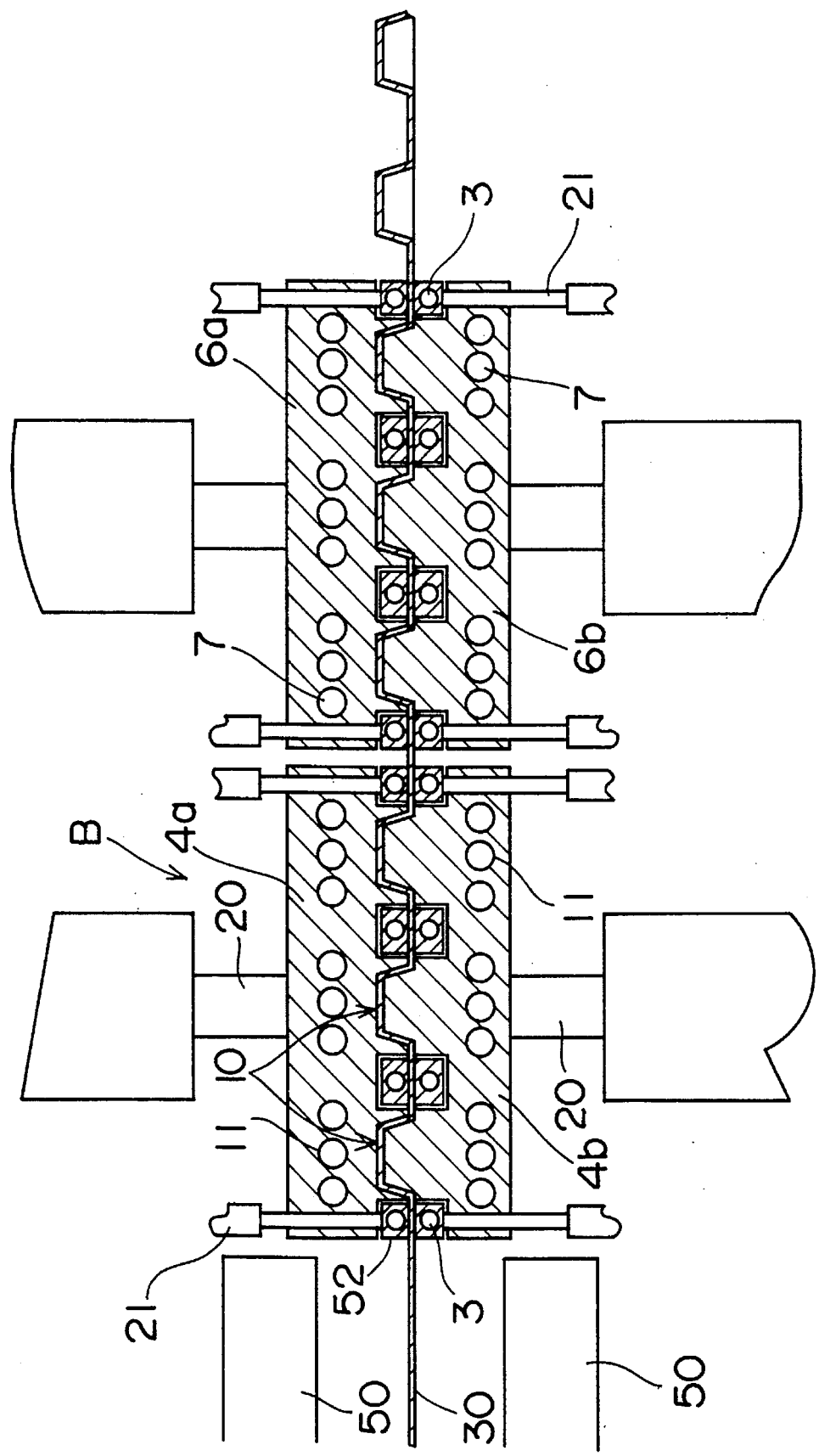
FIG. 7 is a view illustrating in detail a molding process using the molding die B.
Figure 8:
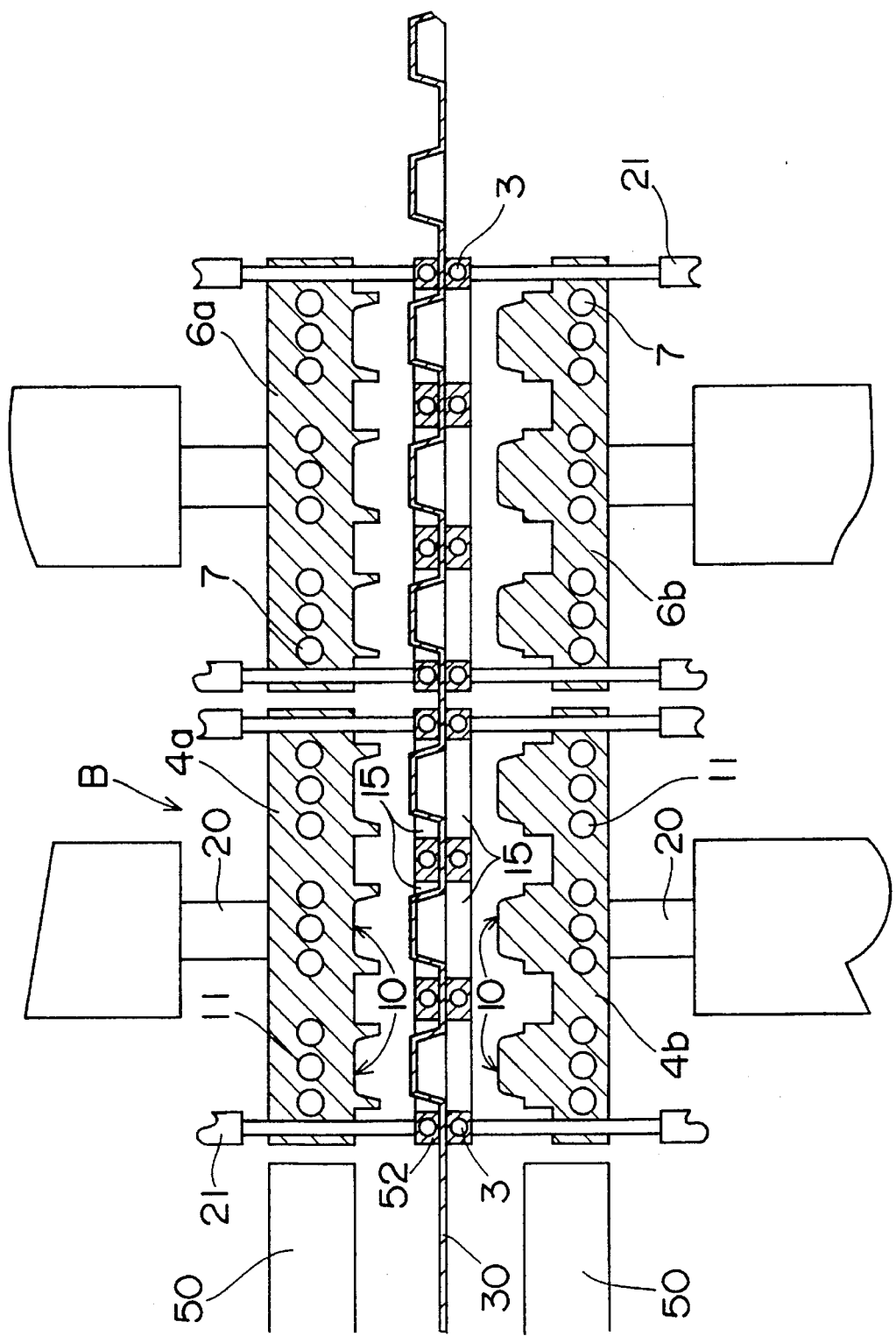
FIG. 8 is a view illustrating in detail a molding process using the molding die B.

In a molding second zone, the foamed PET sheet was cooled with the portion to be trimmed thereof held by a pair of clamp plates 5 which are vertically driven (FIG. 6). The upper and lower clamp plates 52 were set to a temperature of 120° C. The foamed PET sheet was molded under a molding pressure of 0.8 kg/cm$^2$ with the use of the molding die of which molding portions were set to a surface temperature of 160° C. (FIG. 7). After molded, the sheet was maintained for 4 seconds as held between the upper die 4a and the lower die 4b set to a surface temperature of 160° C., thereby to accelerate the crystallization. Then, while the molded sheet was held by the clamp plates 5, only the molding portions were opened to release the sheet from the molding die. The molding die release could readily be carried out without any distortion of the sheet (FIG. 8). Then, the clamp plates 5 were opened. After released from the die, the sheet did not hang down due to its own weight.

In a third zone, the molded sheet was cooled for 4 seconds as held by cooling dies 6a, 6b set to a surface temperature of 73° C. At this time, the molded sheet could be held without any positional shift. After being cooled, the molded products were separated from the portion to be trimmed by punching.

The average crystallinity of the molded products thus obtained was 23.8%. The heat distortion of the molded products was measured as 0.7%. Thus, there were produced Good molded products excellent in heat resistance. The lids well fitted to the molded products before a test of heat distortion, were put onto the molded products after the application of heat thereto. It was made sure that these lids were well fitted to the molded products likewise before the application of heat thereto.

(Example 4)

There was conducted a test in the same manner as in EXAMPLE 3 using a foamed PET sheet identical with that used in EXAMPLE 3, except that the foamed PET sheet was cooled with only the upper clamp plate 52 set to a temperature of 60° C., and the lower clamp plate 52 was not cooled.

The molded sheet was released from the molding die B. The molding die release could readily be carried out without any distortion, as done in EXAMPLE 3. After being released from the die, the sheet did not hang down due to its own weight.

The average crystallinity of the molded products thus obtained, was 24.0%. The heat distortion of the molded products was measured as 0.8%. Thus, there were produced good molded products excellent in heat resistance. The lids, which fitted well to the molded products before a test of heat distortion, were put onto the molded products after the application of heat thereto. It was made sure that these lids fitted well to the molded products likewise before the application of heat thereto.

(Example 5)

There was conducted a test in the same manner as in EXAMPLE 1, except for the following points. There was used a laminated sheet containing a foamed PET sheet identical with that used in EXAMPLE 1 and a non-foamed sheet of thermoplastic polyester resin having a thickness of 50 microns attached to one side of the foamed PET sheet. The laminated sheet was molded such that the non-foamed sheet served as the inner side of a molded product. After being molded, the laminated sheet was maintained for 10 seconds as held by a molding die set to a surface temperature of 175° C., thereby to accelerate the crystallization. The average crystallinity of the laminated non-foamed sheet of thermoplastic polyester resin, was 2.5% before molding.

The molded sheet was released from the molding die. The molding die release could readily be carried out without any distortion, as done in EXAMPLE 1. After released from the die, the sheet did not hang down due to its own weight.

The average crystallinity of the non-foamed sheet portions of the molded products thus obtained, was 27.0%, and the average crystallinity of the foamed sheet portions was 25.4%. The heat distortion of the molded products was measured as 0%. Thus, there were produced good molded products with excellent heat resistance. The lids, which fitted well to the molded products before the test of heat distortion, were put onto the molded products after the application of heat thereto. It was made sure that these lids fitted well to the molded products likewise before the application of heat thereto.

(Comparative Example 1)

There was conducted a test in the same manner as in EXAMPLE 1 using a foamed PET sheet identical with that in EXAMPLE 1, except that parts of the sheet other than the parts which are converted into final products, were not cooled. The other parts to be trimmed, than the parts of the sheet which result in final products, reached a temperature of 163° C.

When releasing the foamed PET sheet, molded without cooling the trimming portions of the molding die, the molded sheet stuck to the molding die and therefore was only released therefrom with difficulty. After being released from the molding die, the molded sheet greatly hung down due to its own weight as shown in FIG. 11.

When attempting to hold the foamed PET sheet in a cooling die 6 in the third zone, the foamed PET sheet could not be held properly, but was held with the center portion thereof positionally shifted from the center portion of the cooling die. After being cooled, the molded products were separated from the portion to be trimmed by punching. At first glance, the external appearance of molded products was good.

Figure 9:
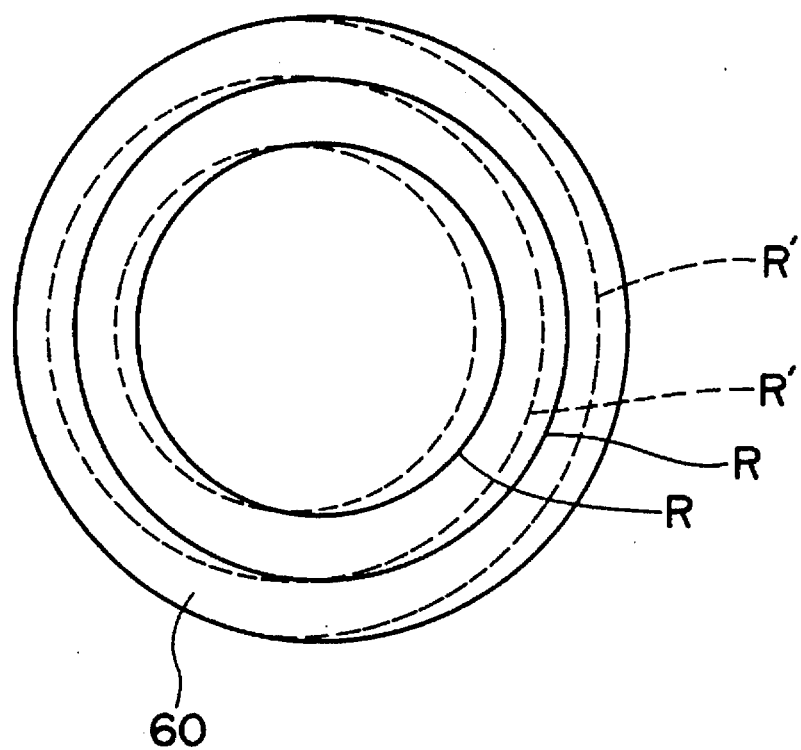
FIG. 9 is a plan view of a positionally shifted molded product, which was obtained in Comparative Example 1, and in which solid lines R define a plan view of a molded product as cooled and trimmed, while broken lines R' define a plan view of a molded product as molded and accelerated in crystallization.
Figure 10A:
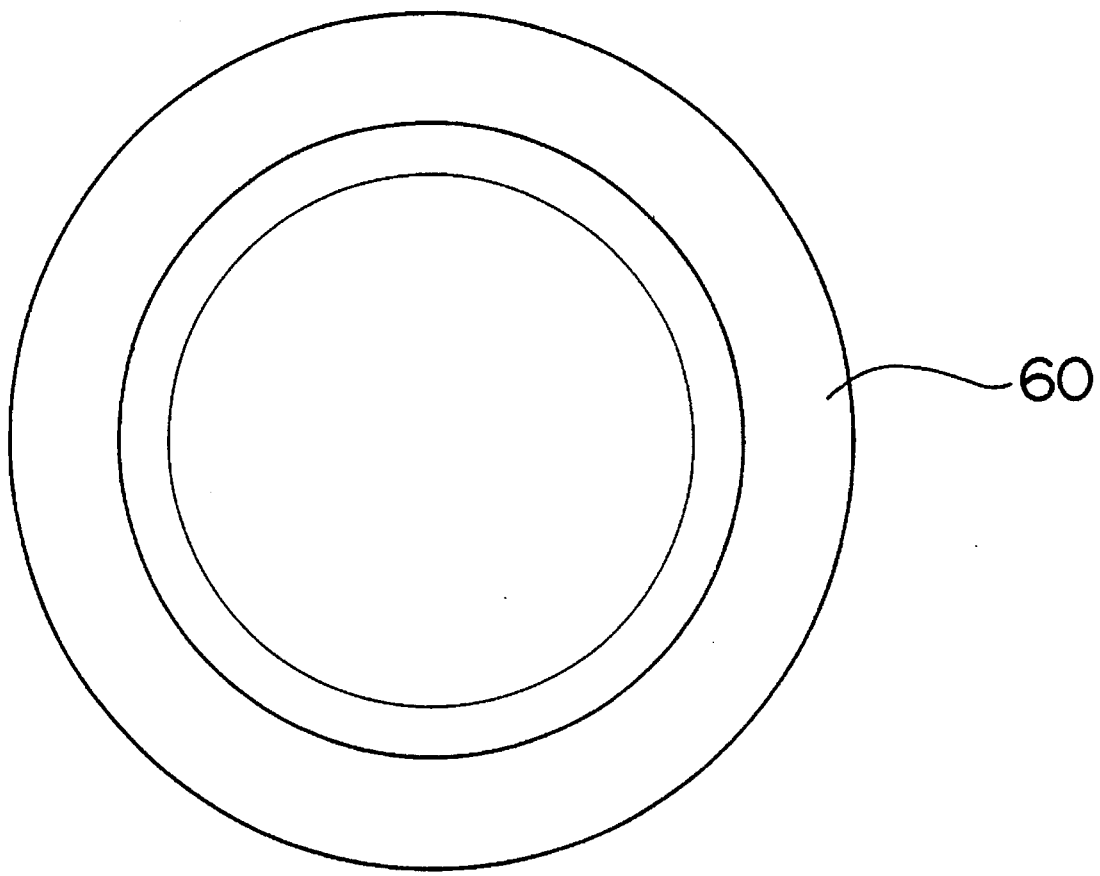
FIG. 10a and FIG. 10b are a plan view and a section view of a sample of a prior art molded product, respectively.
Figure 10B:
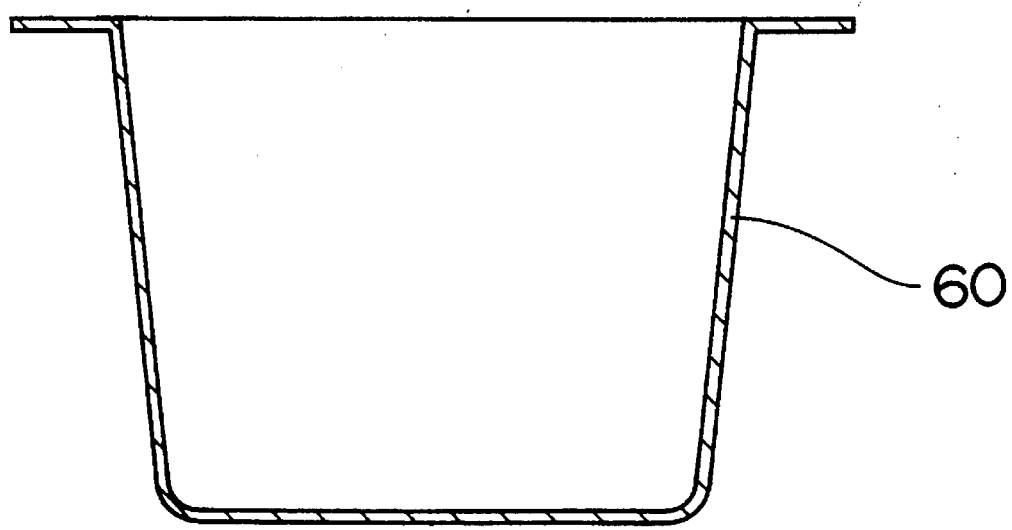

The average crystallinity of the molded products thus obtained, was 25.5%. The molded products were great in distortion due to the application of heat thereto by the oven, and the heat distortion was 3.5%. Further, the rib portion of a molded product in the molding die was positionally shifted from the rib portion in the cooling die. Accordingly, due to the shape memory effect, the plan view of a molded product before the application of heat thereto by the oven (as shown by the solid lines R in FIG. 9) was positionally shifted from the plan view of the molded product after the application of heat as shown by the broken lines R'. The positional shift of the molded product with respect to the cooling die appeared in the molded product after the application of heat thereto. Thus, there were produced poor-looking molded products having uneven respective shapes. Further, the lids fitted well to the molded products before a test of heat distortion, but could hardly be fitted to the molded products, due to the distortion above-mentioned, after the application of heat thereto.

(Comparative Example 2)

There was conducted a test in the same manner as in EXAMPLE 1 using a foamed PET sheet identical with that used in EXAMPLE 1, except that the crystallization was not accelerated after the sheet was molded.

The average crystallinity of the molded products thus obtained was as low as 13.5%. The molded products were greatly distorted after the application of heat thereto by the oven, and presented a heat distortion of 6.5%. The lids fitted well to the molded products before the test of heat distortion, but could not be fitted at all to the molded products, due to the distortion above-mentioned, after the application of heat thereto.

(Comparatime Example 3)

There was conducted a test in the same manner as in EXAMPLE 1 using a foamed PET sheet identical with that used in EXAMPLE 1, except that the sheet was molded with a molding die of which the molding portions were set to a surface temperature of 130° C. and that, after the sheet was molded, and the crystallization was accelerated with the molding die set to a surface temperature of 130° C.

The average crystallinity of the molded products thus obtained, was 16.5%. The molded products were great by distorted after the application of heat thereto by the oven, and presented a heat distortion of 4.5%. The lids fitted well to the molded products before the test of heat distortion, but could not be fitted at all to the molded products, due to the distortion above-mentioned, after the application of heat thereto.

(Comparative Example 4)

There was used a foamed PET sheet. Butane is used as a blowing agent. The foaming was controlled such that the foamed PET sheet had a density of 0.20 g/cm$^3$, a thickness of 0.85 mm and an average crystallinity of 8.5%, and the amount of residual blowing agent was 0.15 mol/kg.

With the use of this foamed sheet, there was conducted a test under the same conditions as in EXAMPLE 1.

The average crystallinity of the molded products thus obtained was 26.5%. The molded products were greatly distorted after the application of heat thereto by the oven, and presented a heat distortion of 3.5%. The lids fitted well to the molded products before a test of heat distortion, but could not be fitted at all to the molded products, due to the distortion above-mentioned, after the application of heat thereto.

What is claimed is:

1. A process for manufacturing a heat-resistant molded foam product which comprises:

(a) passing a foamed polyester resin sheet of low crystallinity into a preheating first zone operated under conditions such that the sheet attains a surface temperature of about 110° C. to about 150° C.;

(b) passing said preheated sheet into a molding second zone containing molding means having a first mold portion with a surface temperature from about 150° C. to about 200° C., (c) heating only that portion of said preheated sheet which will be thermally molded into a final product for a period of from about 2 seconds to about 20 seconds such that the heated portion of the sheet reaches an average crystallinity of greater than about 20%, (d) at substantially the same time as said heating is being carried out, positively cooling the unheated portion of said preheated sheet in said molding second zone to a temperature below the glass transition point of said polyester resin;

(e) molding said sheet in said second zone;

(f) passing the resulting molded product into a third zone;

(g) cooling said resulting product to about ambient conditions in said third zone; and (h) removing the cooled product from said third zone.

2. A process for manufacturing a heat-resistant molded foam product according to claim 1, wherein said heated part of the molding means is a molding portion (10) containing a male die portion (13) and a female die portion (14).

3. A process for manufacturing a heat-resistant molded foam product according to claim 1, wherein said unheated portion of said molding means is cooled to a temperature of about 20° C. to about 130° C. in said molding second zone.

4. A process for manufacturing a heat-resistant molded foam product according to claim 1, wherein said molding second zone, said unheated portion of said molding means is cooled to a temperature of about 20° C. to about 130° C. and only said part of the sheet which is being converted into a final product is heated and molded for a period of from about 2 seconds to about 10 seconds such that said heated portion of said preheated sheet reaches an average crystallinity of greater than about 20%.

5. A process for manufacturing a heat-resistant molded foam product according to claim 1, wherein said foamed polyester resin sheet of low crystallinity has a density of about 1.27 g/cm$^3$ to about 0.175 g/cm$^3$, a thickness of about 0.1 mm to about 5 mm and an average crystallinity of 0% to about 18%.

6. A process for manufacturing a heat-resistant molded foam product according to claim 4, wherein distortion of said molded product as heated to a temperature of about 170° C. to about 240° C., is not greater than about 2%.

7. A process for manufacturing a heat-resistant molded foam product according to claim 1, further comprising bonding a laminated sheet containing a non-foamed film of thermoplastic resin to at least one side of said foamed polyester resin sheet of low crystallinity to form a composite, and molding said composite with said non-foamed film disposed on a female said of said product.

8. A process for manufacturing a heat-resistant molded foam product according to claim 7, wherein said non-foamed film layer has a thickness of 10 to 500 microns and said foamed polyester resin sheet is thicker than said non-foamed film layer.

9. A process for manufacturing a heat-resistant molded foam product according to claim 7, wherein the material of said non-foamed film is selected from the group consisting of thermoplastic polyester, polyolefin, polyamide, polyvinyl chloride, polyacrylonitrile, polyvinylidene chloride and an ethylene-vinyl alcohol copolymer.

10. A process for manufacturing a heat-resistant molded foam product according to claim 7, wherein said non-foamed film is made of thermoplastic polyester resin.

* * * * *